United States Patent [19]
Kato et al.

[11] Patent Number: 5,243,335
[45] Date of Patent: Sep. 7, 1993

[54] LOCAL AREA NETWORK SYSTEM

[75] Inventors: Tetsuo Kato, Machida; Shigemi Tanabe, Takatsuki; Chiaki Koshiro, Machida, all of Japan

[73] Assignee: Omron Tateisi Electronics Co., Kyoto, Japan

[21] Appl. No.: 924,791

[22] Filed: Aug. 6, 1992

Related U.S. Application Data

[63] Continuation of Ser. No. 391,029, Aug. 9, 1989, abandoned.

[30] Foreign Application Priority Data

Aug. 10, 1988 [JP] Japan ................................. 63-199339
Aug. 17, 1988 [JP] Japan ................................. 63-204238
Aug. 19, 1988 [JP] Japan ................................. 63-205891

[51] Int. Cl.$^5$ ............................................. H04Q 3/00
[52] U.S. Cl. ........................... 340/825.05; 370/85.5; 370/85.4
[58] Field of Search .................. 340/825.05; 370/85.4, 370/85.5, 85.12, 85.15, 82, 83

[56] References Cited

U.S. PATENT DOCUMENTS

| | | | |
|---|---|---|---|
| 4,491,946 | 1/1985 | Kryskow, Jr. et al. | 370/85.4 |
| 4,511,958 | 4/1985 | Funk | 370/85.4 X |
| 4,622,550 | 11/1986 | O'Conner et al. | 370/85.5 X |
| 4,688,035 | 8/1987 | Gray et al. | 370/82 X |

Primary Examiner—Ulysses Weldon
Attorney, Agent, or Firm—Dickstein, Shapiro & Morin

[57] ABSTRACT

A local area network system in which a logical ring is formed by at least part of said node stations to pass a token frame from one station to another in an endless and cyclic fashion allowing each of said node stations which has received is allowed to transmit data, and said data comprises event data. Since only the stations holding the token are allowed to transmit cyclic data and event data, each station is not required to be equipped with a monitoring timer so that not only the LAN can be constructed economically but also transmission efficiency can be improved through speed up in determining the completion of data transmission.

8 Claims, 7 Drawing Sheets

LOCAL AREA NETWORK SYSTEM

This application is a continuation of application Ser. No. 07/391,029 filed Aug. 9, 1989, now abandoned.

TECHNICAL FIELD

The present invention relates to a local area network (LAN) system which cyclically transmits data according to the system of passing a token around a logical ring, and in particular to an improved local area network system which permits transmission of both cyclic data and event data.

BACKGROUND OF THE INVENTION

In conventional cyclic transmission systems which are based upon the system of passing a token through a logical ring, the order of the stations for transmitting data is determined, for instance, according to the order of their addresses in a network management information table, and each of the stations transmits data after monitoring that the preceding station has finished data transmission.

However, according to such conventional transmission systems, when event data or incidental transmission data which arise at arbitrary timing coexist with cyclic data in each station, or when there are stations which are dedicated to the transmission of event data, each station is required to monitor the existence of any event data in the data transmitted from the preceding station, and is therefore required to be equipped with a monitoring timer. In particular, the determination of completion of a retransmission of event data after the occurrence of a transmission error is very time consuming.

According to a conventional method for controlling data transmission in a local area network (LAN), it has been known to provide a timer for determining the time period during which a token (transmission priority) can be held, and to allow data transmission from the time the token is received until the timer times out.

However, according to such a method for controlling the length of transmitted data, if the token is required to go entirely around the logical ring, it is necessary for the sum of the timer settings of all the stations to be equal to the time required for the token to be passed entirely around the logical ring, and the total sum of the timer settings must be checked before starting up the system. Further, to even more complicate the operation of the system, the timer settings of all the stations must be revised every time a station is either added to or removed from the logical ring, and the revision of the timer settings requires a considerable time.

BRIEF SUMMARY OF THE INVENTION

In view of such problems of the prior art, a primary object of the present invention is to allow each station to pass a token (transmission priority) to a succeeding station so that only the station holding the token at any particular moment be allowed to transmit cyclic data and, if any, event data, and the need for a previously required monitoring timer is eliminated.

A second object of the present invention is to allow a token to be passed entirely around a logical ring without requiring a timer by providing a field indicating the permissible length of transmission data in the token frame representing a transmission priority.

These and other objects of the present invention can be accomplished by a local area network system comprising a plurality of node stations connected to a common communication line, wherein: a logical ring is formed by at least part of the node stations to pass a token frame from one station to another in an endless and cyclic fashion allowing each of the node stations which has received the token frame to transmit data, and the data comprise event data. Typically, the transmitted data comprise both event data and cyclic data.

Thus, according to the present invention, since only the stations holding the token are allowed to transmit cyclic data and event data, each station is not required to be equipped with a monitoring timer so that not only the LAN can be constructed economically but also transmission efficiency can be improved through speed up in determining the completion of data transmission.

According to a preferred embodiment of the present invention, the token frame includes a field defining a permissible length of transmitted data, and each of the node stations is provided with means for transmitting its data only when its data are not longer than the permissible length of transmitted data.

Thus, according to this embodiment, since a field indicating the permissible length of transmitted data is provided in the token frame representing a transmission priority instead of using a timer, and the token is passed entirely around a logical ring according to the data length, the time required for the token to be passed entirely around the logical ring can be simply selected, and the handling of the system is substantially simplified.

According to another preferred embodiment of the present invention, at least one of the node stations comprises a data communication unit for controlling transmission of data, memory means for storing data received by the data communication unit, an application unit for processing the data stored in the memory means, and a timer for measuring a time interval which has elapsed since the token was received by the station in a preceding cycle of passing the token along the logical ring, the data communication unit being suspended from transmitting data until the timer has timed out. Thereby, possible interference from data reception on the operation of the application unit can be avoided, and the reliability of the system can be improved.

BRIEF DESCRIPTION OF THE DRAWINGS

Now the present invention is described in the following with reference to the appended drawings, in which.

DETAILED DESCRIPTION OF THE PREFERRED EMBODIMENT

Figure 1:
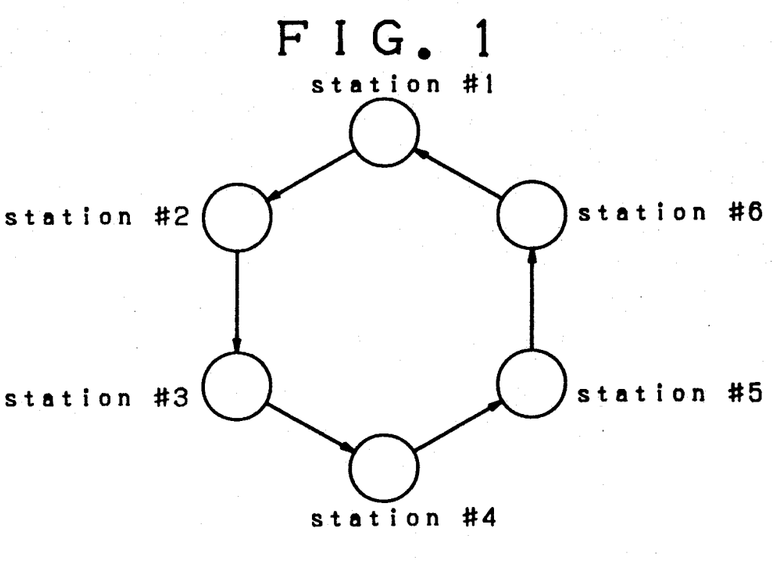
FIG. 1 illustrates a logical ring for a token passing system.

FIG. 1 illustrates a logical ring in which data transmission is controlled by the system of passing a token, and a transmission priority (a token) is passed through this logical ring to allow N:N data transmission. In the present embodiment, a logical ring is formed by stations 1 through 6, and the token is passed around the stations 1 through 6 in the direction indicated by the arrow at a certain timing and in a cyclic fashion.

Figure 2:
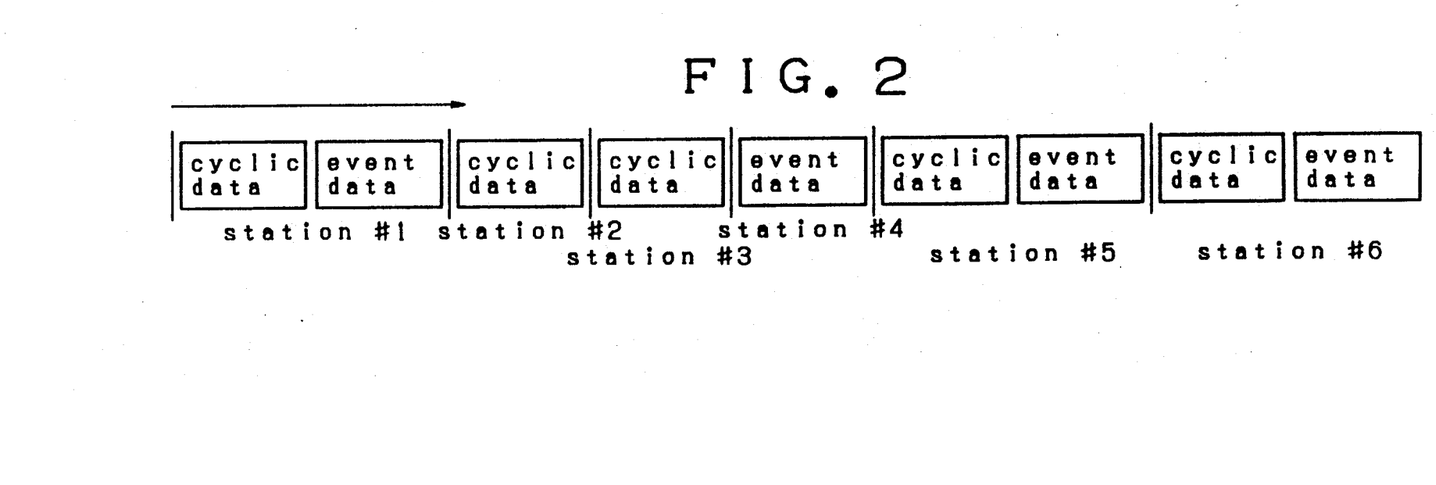
FIG. 2 illustrates the order of transmitting cyclic data and event data as the token is passed completely around the logical ring.

FIG. 2 illustrates the order of transmitting cyclic data and event data according to the token passing system, and, according to the present embodiment, the stations 1, 5 and 6 are stations for both cyclic data and event data, the stations 2 and 3 are stations only for cyclic data, and the station 4 is only for event data.

Figure 3:
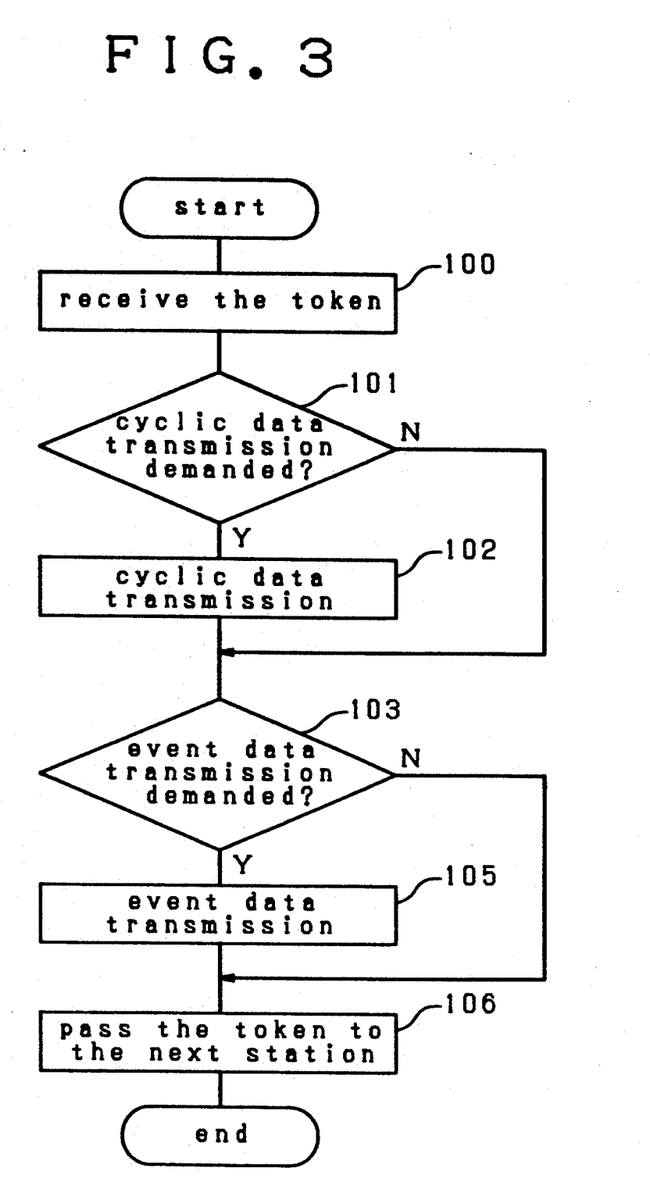
FIG. 3 is a flow chart for describing the processing at each of the nodes.

FIG. 3 is a flow chart illustrating the processing at each of the nodes. According to the system of the present invention, a logical ring (stations 1 through 6) is formed to determine the order of passing the token, and cyclic data are transmitted as the token is passed around the logical ring.

The token is received from the preceding station in step 100. If the station which has received the token is a station for cyclic data (yes in step 101), cyclic data are transmitted from this station (step 102). Then, it is determined whether a demand for transmitting event data exists or not (step 103), and if there is indeed a demand for transmitting event data, the event data are transmitted (step 105) and the token is passed to the next station along the logical ring.

On the other hand, if the station which has received the token in step 101 is not a station for transmitting cyclic data (no in step 101), the program flow advances to step 103 from which the program flow further advances to step 105 to transmit event data if there is a demand for event data transmission. If there is no demand for event data transmission in step 103 (no in step 103), the token is simply passed to the next station without any event data transmission.

When all of the stations have conducted the above mentioned processes as the token is passed on to them, one cycle of cyclic data transmission is completed.

Thus, according to the present embodiment, since each station is not required to be equipped with a monitoring timer and there is no need to monitor the transmission of event data by the preceding station, the LAN can be constructed economically, and the efficiency of data transmission can be improved.

Figure 4:
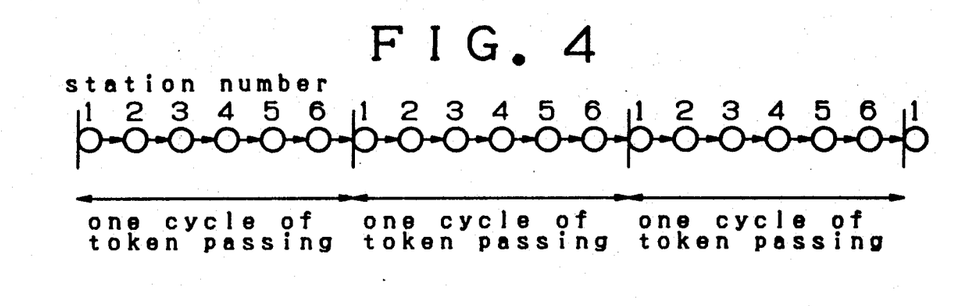
FIG. 4 illustrates the time required for passing a token entirely around the logical ring.

In the second embodiment, a logical ring is likewise formed by stations 1 through 6, and the token is passed around the stations 1 through 6 in the direction indicated by the arrow at a certain timing and in a cyclic fashion, as shown in FIGS. 1 and 4.

Figure 5:
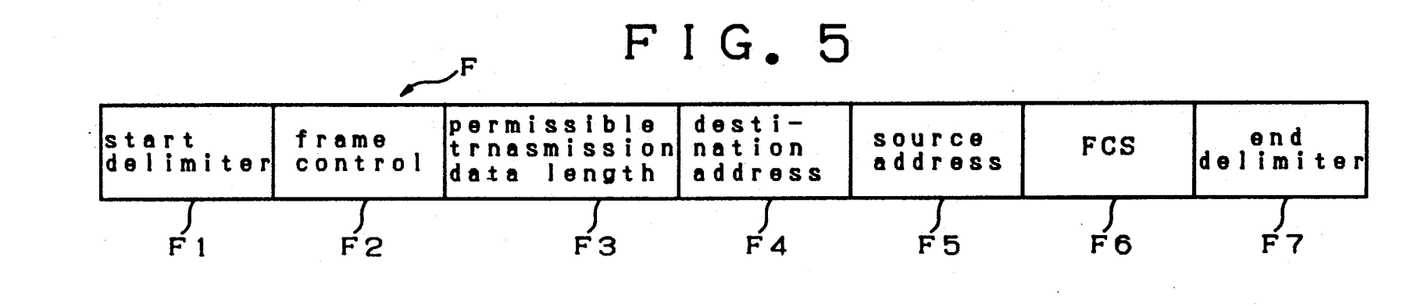
FIG. 5 illustrates the structure of the token frame.
Figure 6:
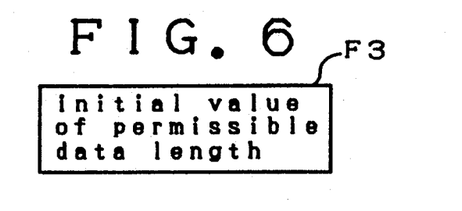
FIG. 6 illustrates the contents of the memory for storing the initial value of the permissible transmission data length.

FIG. 5 illustrates the format and the contents of a token frame F which consists of a start delimiter portion F1, a frame control portion F2, a permissible transmission data length portion F3, a receiver address portion F4, a sender address portion F5, a FCS (frame check sequence) portion F6, and an end delimiter portion F7. Memory in the token frame of station 1 stores the initial value F3' of the new permissible transmission data length which has been renewed after the token has been passed entirely around the logical ring (refer to FIG. 6).

Figure 7:
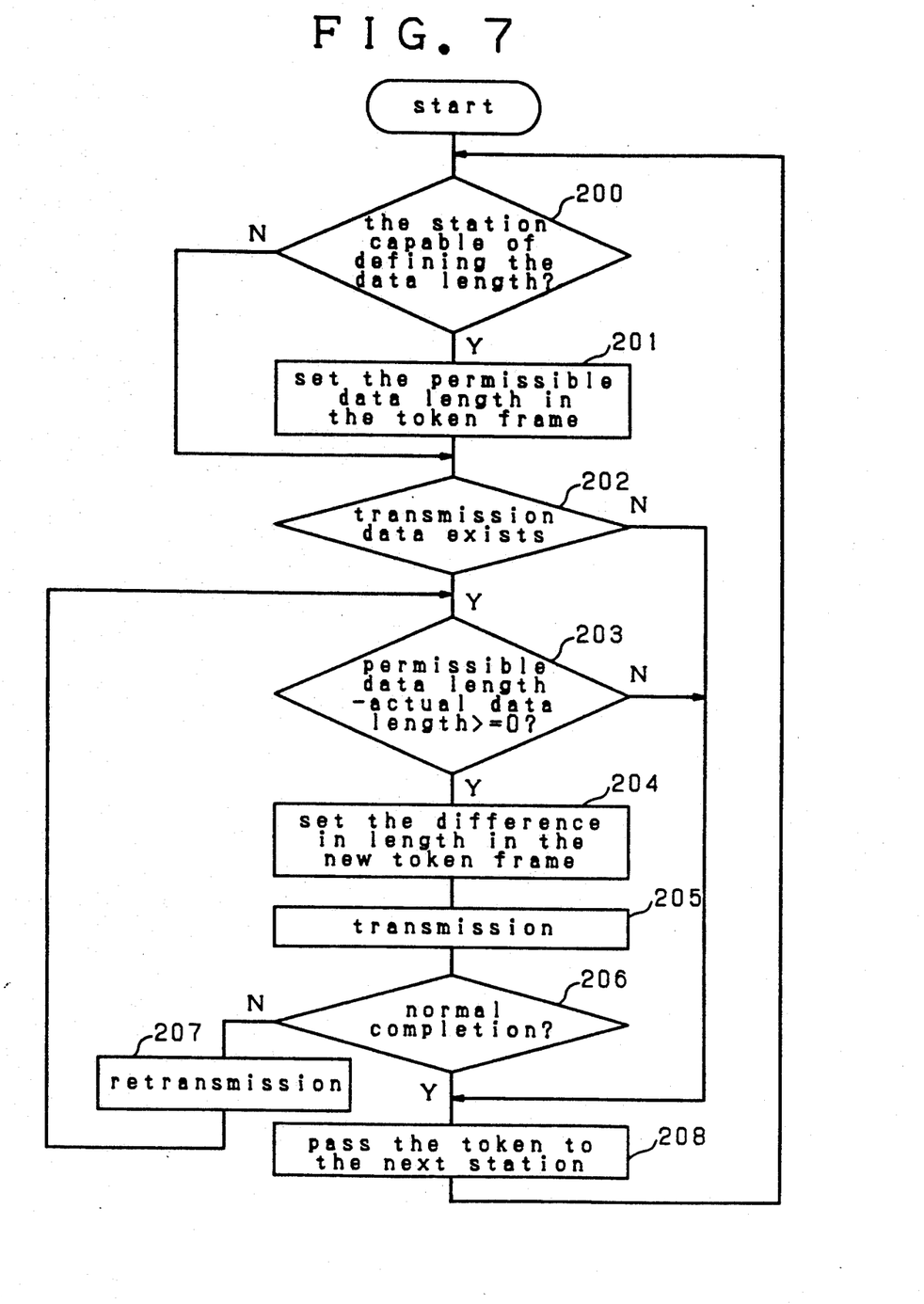
FIG. 7 is a flow chart for describing the process of processing the permissible transmission data length in the token frame.

Now the process of processing the permissible transmission data length of the token frame is described in the following with reference to the flow chart illustrated in FIG. 7.

First of all, power is turned on, and the processing is started.

It is determined in step 200 whether the station holding the token is a station for initially setting up the permissible transmission data length or not, and if it is found to be the initial setup station (station 1 in this case), an initial value of the permissible transmission data length is set up within the token frame of this station (step 201).

Then, it is determined in step 202 whether there are transmission data in the present station or not, and the existence of data in the present station is determined in step 202 (yes in step 202). Then, the length of the data which are about to be transmitted is subtracted from the permissible transmission data length in the token frame, and if the difference is equal to or larger than zero, the transmission data length after the subtraction is set up in the token frame before it is transmitted (steps 203 through 205).

When the transmission has been completed normally (step 206), the token is passed to the next station. If the transmission has not been completed normally, a re-transmission process is carried out (step 207), and the program flow returns to step 203.

If there are not data to be transmitted in step 202 (no in step 202), or when the difference after the subtraction is negative (no in step 202), no data transmission takes place, and the received permissible transmission data length is simply passed on to the next station (step 208). In the next station to which the token has been passed, the program flow advances to step 202 via step 200 (no), and the above described action is repeated.

The token is passed around the logical ring, and each station determines whether it should transmit or not according to the permissible transmission data length in the token frame and the length of the data which is about to be transmitted therefrom.

When the token has been passed entirely around the logical ring and has returned to the original station 1, a new initial value for the permissible transmission data length is set up in the token frame, and the above described action is repeated.

Thus, according to the present embodiment, since a field indicating a permissible transmission data length is provided in the token frame instead of using a timer, and the token is passed around the logical ring according to the length of transmitted data, the time required for the token to be passed entirely around the logical ring can be set up within a prescribed time interval, and the handling of the system is substantially improved.

Typically, to control the overall time required for the token to go entirely around the logical ring, the time interval during which each node station can hold the token is limited. This permits reliable and high speed transmission even when the traffic in the network system has increased. However, each node station of such a LAN is provided with a communication unit for controlling data communication and an application unit to process the data stored in the memory of the communication unit, and if the token comes around while the application unit is still processing the previously received data, this will interfere with the operation of the application unit, and the reliability of the system will be lost.

The following embodiment is intended to eliminate such a potential problem by stopping the operation of the communication control unit while the time interval required for the application unit to complete its job.

Figure 8:
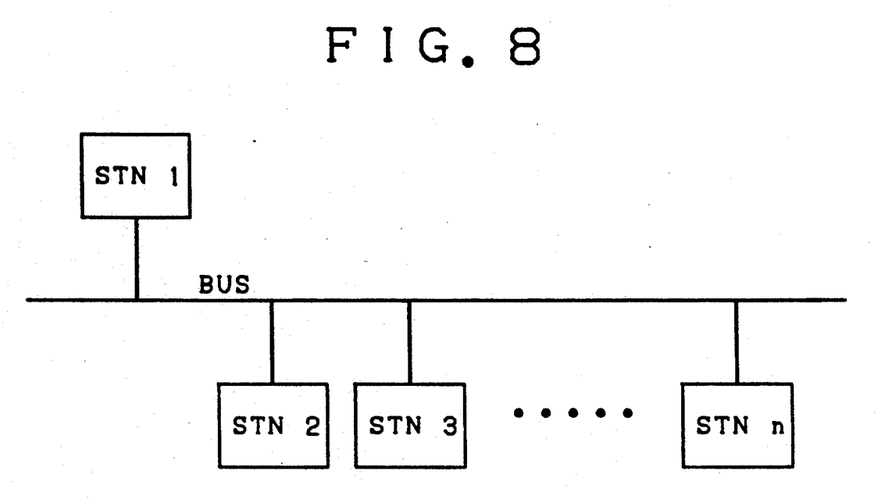
FIG. 8 illustrates an embodiment of the bus-type LAN according to the present invention.

FIG. 8 illustrates the general structure of the bus-type LAN according to the present invention. Referring to FIG. 8, BUS denotes a bus transmission line, and STN1 through STNn denote node stations which are connected to this bus transmission line. The first node station STN1 is a master station which monitors the time interval required for the token to go entirely around the logical ring, and passes the token around the logical ring always at a fixed period.

Figure 9:
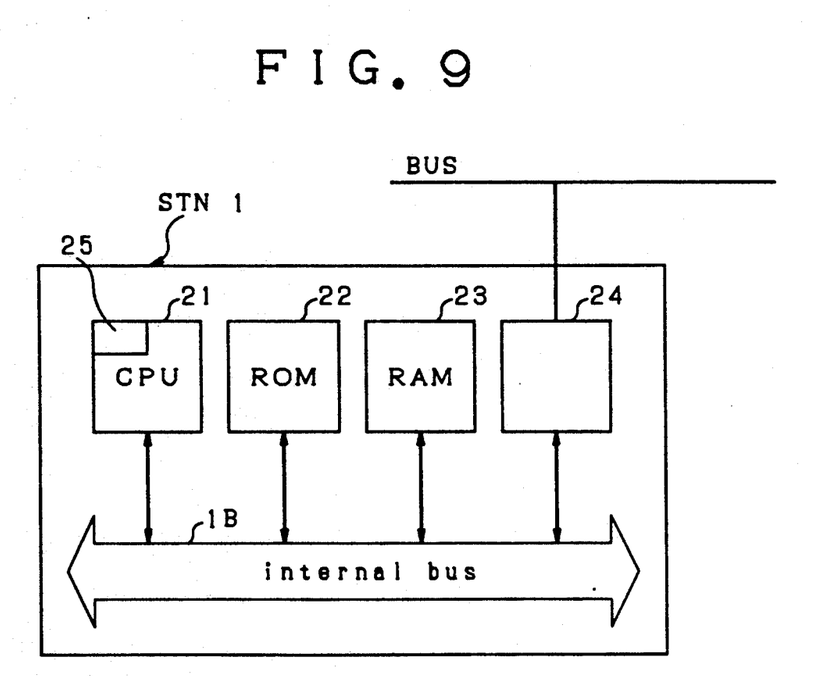
FIG. 9 is a block diagram illustrating the internal structure of one of the node stations.

FIG. 9 illustrates the internal structure of the node station STN1 which comprises a CPU 21, ROM 22, RAM 23, a transmission control unit 24, and an internal bus IB connecting these parts together. The CPU 21 controls the communication control unit 24 and carries out the exchange of various frames with the bus and monitoring of the time interval required for the token to go entirely around the logical ring so that the token may be passed around at a fixed timing, according to the program stored in the ROM 22. The application unit may consist of a part of the CPU 21 as denoted by numeral 25.

Figure 10:
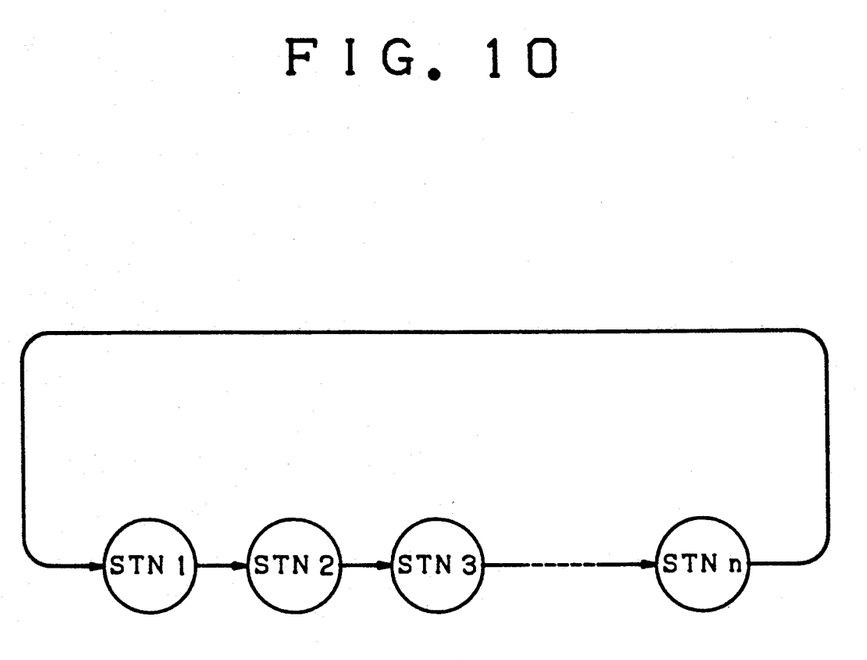
FIG. 10 schematically illustrates a logical ring.

FIG. 10 illustrates how the token is passed from one station to another. In this logical ring, the token is passed in an endless fashion, or the token received by the last station STNn is returned to the first station STN1.

Figure 11:
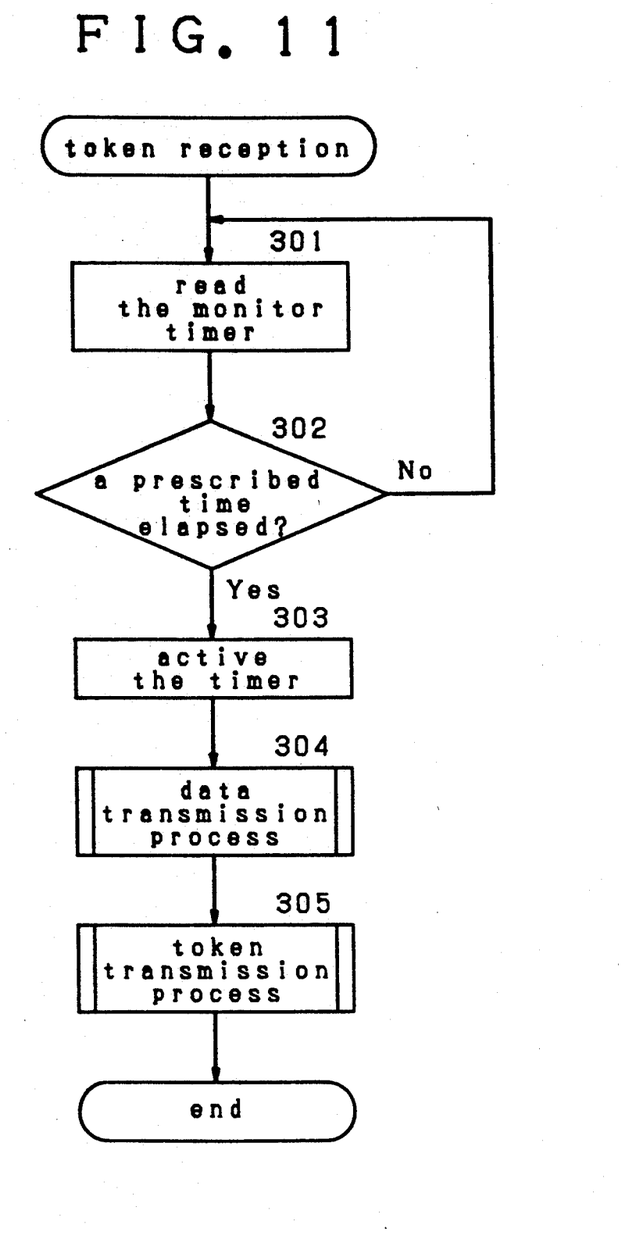
FIG. 11 is a flow chart illustrating the operation of one of the node stations.

FIG. 11 is a flow chart describing the operation of the node station STN1. When the token is received by this station, the time elapsed after the reception of the token in the previous cycle is read out in step 301. As long as a predetermined time allocated to the particular station has not run out (no in step 302), the program flow returns to step 301, and this is repeated until the time interval allocated to this station runs out. The aforementioned predetermined time is a time interval required for the application unit of this particular station to process the data received by the communication unit and stored in the RAM 23.

If the time which has been read out becomes larger than the predetermined time period (yes in step 302), the value of the timer is cleared, and the measurement of the time during which the token is held in the next cycle is started in step 303.

When there is any demand for data transmission, transmission of data and reception of a response to the transmission are carried out in step 304. There is an upper limit to the time interval which each of the stations can use, and after data transmission of a certain time interval has been carried out, the token is passed to the station which is next thereto in the logical ring in step 305. When a response is received from the recipient of the token, the process of data communication is concluded. If no response is received from the intended recipient of the token, a necessary token recovery process is carried out.

According to this embodiment, by providing a timer to each of the node stations of the network, the time for the token to go entirely around the logical ring can be kept constant so that a time period for data processing can be properly allocated, and the loss of data due to shortage of such a processing time can be prevented.

What we claim is:

1. A local area network system, comprising:
a plurality of node stations connected to a common communication line, such that each one of said plurality of node stations can communicate with at least one other of said plurality of node stations;
each one of said plurality of node stations communicating with said at least one other of said plurality of node stations by passing a token frame which allows the transmission of at least one of cyclic and event data to said at least one other of said plurality of node stations; wherein,
a logical ring is formed by at least part of said plurality of node stations to pass said token frame from one node station to another in an endless and cyclic fashion and whereby each one of said plurality of node stations which has received said token frame is enabled to transmit at least one of said cyclical and event data and wherein,
at least one of said plurality of node stations comprises a data communication unit for controlling the timing of the transmission of said token frame on said logical ring, and a timer connected to said communication unit for setting a predetermined cycle time and for measuring an actual time interval which has elapsed since said token frame was received by said at least one station in a preceding cycle of passing the token frame along said logical ring, said communication unit including means for suspending the transmission of said token frame onto said logical ring when the actual time interval for said token frame to complete a cycle is less than the predetermined time set by said timer.

2. A local area network system according to claim 1, wherein said transmitted data comprise both event data and cyclic data.

3. A local area network system according to claim 1, wherein said token frame includes a field defining a permissible length of transmitted data, and each one of said plurality of node stations is provided with means for transmitting its data only when its said data are not longer than said permissible length of transmitted data.

4. A local area network system according to claim 1, wherein said at least one node station further comprises a memory means connected to said data communication unit for storing dta received by said data communication unit, and an application unit connected to receive stored data from said memory means for processing the data stored in said memory means.

5. A local area network system according to claim 1, wherein the communication unit suspends the transmission of said token frame until said timer has timed out to make said actual cycle time equal said predetermined cycle time.

6. A local area network system, comprising:
a plurality of node stations connected to a common communication line, such that each one of said plurality of node stations can communicate with at least one other of said plurality of node stations;
each one of said plurality of node stations communicating with said at least one other of said plurality of node stations by passing a token frame which allows the transmission of at least one of cyclic and event data to said at least one other of said plurality of node stations, said token frame including a field defining a permissible length of transmitted data; wherein,
a logical ring is formed by at least part of said plurality of node stations to pass said token frame from one node station to another in an endless and cyclic fashion and whereby each one of said plurality of node stations which has received said token frame is enabled to transmit at least one of said cyclical and event data and wherein, each of said plurality of node stations comprising means for determining whether the total amount of data to be transmitted therefrom are not longer than said permissible length of transmitted data and means, responsive to said determining means, for transmitting said data to be transmitted when said data to be transmitted are not longer than said permissible length of transmitted data and for preventing the transmission of said data to be transmitted when said data to be transmitted is longer than said permissible length of transmitted data and wherein, the time required for the token to be passed entirely around the logical ring is determined by the field defining a permissible length of transmitted data.

7. A local area network system as in claim 6, wherein each of said node stations further comprises:

means for determining if there is any data to be transmitted and means for passing a token to the next station when there is no data to be transmitted.

8. A local area network system as in claim 6, wherein said determining means determines a difference in length between said permissible length of transmitted data and the length of said data to be transmitted and when said data to be transmitted are not longer than said permissible length of transmitted data sets said difference in a token frame which is transmitted.

* * * * *